Oct. 31, 1961     E. ZILLMER     3,006,243
SLIDE PROJECTOR

Filed April 24, 1959     3 Sheets-Sheet 1

Inventor:
E. Zillmer

Oct. 31, 1961   E. ZILLMER   3,006,243
SLIDE PROJECTOR
Filed April 24, 1959   3 Sheets-Sheet 2

Inventor:
E. Zillmer

United States Patent Office 3,006,243
Patented Oct. 31, 1961

3,006,243
SLIDE PROJECTOR
Erich Zillmer, Saarbruckener Strasse 263,
Braunschweig-Lehndorf, Germany
Filed Apr. 24, 1959, Ser. No. 808,762
Claims priority, application Germany Apr. 28, 1958
8 Claims. (Cl. 88—28)

The present invention relates to a slide projector, and more particularly to a projector in which the mechanically movable parts are driven by an electric motor. These moving parts consist of the reciprocating slide carrier and of the slides magazine. The slide carrier moves the slides out of the slides magazine toward the projecting lens into a position ready for projection and then back into the slides magazine which, in turn, after the projection of one slide is moved forwardly by a distance equalling the thickness of two slides within the magazine in order to bring the slide which is next in line within reach of the slide carrier. It is one object of the invention to provide suitable means for supporting the rotating drive and control means which transmit the driving power of the motor to the mentioned mechanical parts for mounting these means on the tube in which the projecting lens is rotatably and axially adjustable for the purpose of sharply focusing the lens. By utilizing this lens tube as a support for the mentioned driving and control means a large mounting surface is provided for these parts, while at the same time considerable space is saved within the projector housing permitting the same to be made relatively small.

The invention concerns especially such types of projectors in which the magazine holding the slides is attached to the actual projector at a point laterally of the lamp housing and movable parallel to the optical axis of the lens. In such a projector, the slide carrier which is adapted to move the slides from the slides magazine into a position ready for projection and then to return them into the magazine is provided with an actuating arm which enters into the magazine through a lateral slot therein. Thus, the magazine cannot be moved as long as the actuating arm projects into the same. The slides magazine can therefore be advanced only when the said actuating arm has moved out of the magazine, and this movement is effected while the slide is being returned from its projecting position into the magazine by means of another arm at the opposite end of the slide carrier. This opposite arm will not enter into the magazine since the slides partially extend from the magazine at the side facing toward this arm.

In order to eliminate as much lost motion as possible during the movement of the slide carrier and to permit the carrier to be made as short as possible, it is mounted so that it only has to continue to move for a relatively short distance in the same direction after its actuating arm has left the magazine. This distance is so short that the slide carrier can be used to move the relatively heavy magazine and the transmission means actuated by the magazine only if a high transmission ratio is employed to convert this small movement.

According to the present invention this disadvantage is overcome by moving the magazine by means of the mentioned driving elements which are mounted on the guide tube of the projector lens. This short movement of the slide carrier will then only serve the purpose of connecting to the magazine the means for transmitting thereto the rotary movements of these driving elements and of thereafter disconnecting these means from the magazine. These connecting and disconnecting movements by means of the slide carrier require only very little mechanical force.

It is another object of the invention to provide suitable control means for interrupting the normal slide carrier movements as soon as the mentioned actuating arm of the slide carrier has moved one slide out of the magazine into a position ready for projection, thus causing the slide to remain in that position as long as the picture on the slide is to be projected on the screen.

The same control means according to the invention are also designed for the purpose of stopping the slide carrier movements when the actuating arm of the slide carrier is outside of the magazine. This is necessary when the magazine is to be replaced and when it must not be prevented by the mentioned actuating arm from being freely movable.

The mentioned control means are likewise rotatably mounted on the guide tube of the projector lens.

When speaking of a "normal slide carrier movement," this is supposed to mean one cycle of operation during which a slide is returned from its position at the projector lens to the magazine, the slide carrier movement is interrupted during the forward movement of the slides magazine, and the next slide is thereafter moved into the position for projection.

Further objects, features, and advantages of the present invention will appear from the following detailed description thereof, particularly when read with reference to the accompanying drawings, in which—

FIGURE 4 shows a diagrammatic view of a slide carrier for moving the slides into and out of their projecting position; while

Figure 1:
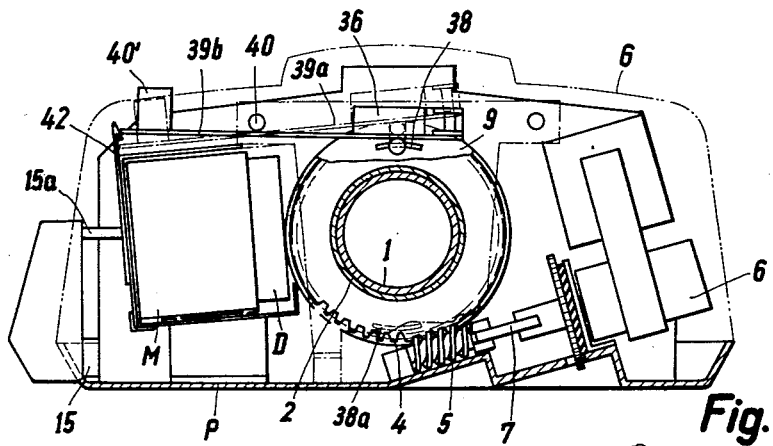
FIGURE 1 shows a front view of a projector with its hood removed, the hood being indicated by dot-and-dash lines.

As illustrated in the drawings, the projector is mounted on a base plate P and is enclosed by a removable hood-like housing G on the base plate, the housing being indicated in FIGURE 1 by dot-and-dash lines. H indicates the lamp housing containing the lamp L and the optical system O. At one side of the housing H, a cooling fan V is provided which is driven by an electric motor E for ventilating the lamp housing, while at the other side of the lamp housing the slides magazine M is mounted which is slidable on base plate P in a direction parallel to the axis of the projector lens 1 and contains a supply of slides D.

The projector lens 1 is mounted within a guide tube 2 so as to be rotatable about its central axis as well as slidable in the axial direction. Guide tube 2 is secured to a wall 3 of the projector and carries a driving gear 4 which is freely rotatable thereon and in engagement with a worm 5 which is rotated by an electric motor 6 through an elastic coupling 7. A control disk 9 is rigidly connected with driving gear 4 by means of bolts 8 and thus likewise rotatable on guide tube 2.

A crank pin 10 mounted on control disk 9 engages into a guide rail 11 of a U-shaped cross section which is secured in a vertical position to a cover plate 12. This plate 12 is adapted to cover the light aperture 13 in a wall 14 during the time while a slide is returned from the projecting position into the magazine and while the next slide is moved into the projecting position. Cover plate 12 is secured to a slide carrier 15 which is adapted to slide back and forth in guides 16 mounted on base plate P and in a direction transverse to the optical axis. The slide carrier 15 has an actuating arm 15a which is adapted to enter into the magazine M through a slot 17 in a side wall thereof to push one slide out of the open side of the magazine opposite slot 17 toward the light aperture 13. In this movement the slide runs in guides 14a on wall 14. During the return movement of slide carrier 15 a second arm 15b thereon extending in the opposite direction of arm 15a pushes the slide from its position in front of the light aperture 13 back into the magazine, whereupon the latter will move forwardly by a distance of two slides and the slide carrier 15 will then move the new slide toward the light aperture 13 in the manner as above described.

The reciprocating movements of slide carrier 15 as well as the mentioned movement of the slides magazine M are produced by gear 4 and control disk 9 which are rotatably mounted on guide tube 2 of projector lens 1. By means of crank pin 10 engaging into the U-shaped rail 11 the control disk 9 operates like a crank to reciprocate slide carrier 15 like a connecting rod and move crank pin 10 upwardly and downwardly in rail 11.

A lug 18 on slide carrier 15 carries a coupling arm 19 which is pivotable on a vertical pin 20 and constantly urged by a spring 21 in the direction of slide carrier 15. The free front end of the coupling arm 19 forms a pointed tongue 22 which is slidable between two stops 23 and 24 of a coupling member 25 when slide carrier 15 returns a slide from the light aperture 13 into the magazine M and reciprocates a distance of two slides in order to effect the forward movement of a new slide for engagement with the slide carrier.

One end of the coupling member 25 carries a draw spring 26 which is fastened at its other end to a bar 27 and tends to move the coupling member 25 constantly in a direction opposite to the feeding movement of magazine M, as indicated by the arrow X. This movement is restricted by stop 24 contacting wall 14 which constitutes the starting position of coupling member 25 for each feeding movement of the slides magazine.

When the tongue-shaped end 22 of the coupling lever enters between stops 23 and 24, this movement also moves pin 28, which is secured to coupling lever 19, between the teeth of a rack 29 which is secured to or integral with magazine M.

One end of the coupling member 25 opposite the end on which spring 26 is fastened is pivotally connected to an arm 30a of a two-armed control lever 30a, 30b which is pivotable about a pin 30, while the other arm 30b thereof carries a roller 32 which rests upon a cam 33 which is secured to or integral with driving gear 4.

Figure 2:
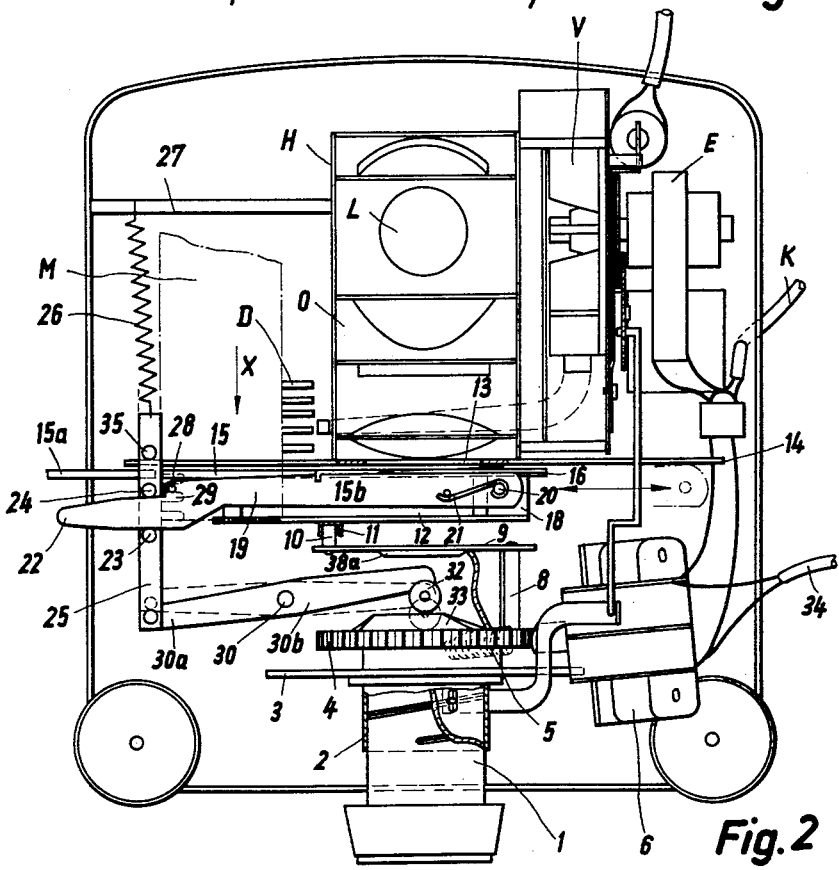
FIGURE 2 shows a plan view of the mechanism of the projector with the hood removed and some of the control elements being omitted, and with the guide tube of the lens being partly shown in section.
Figure 3:
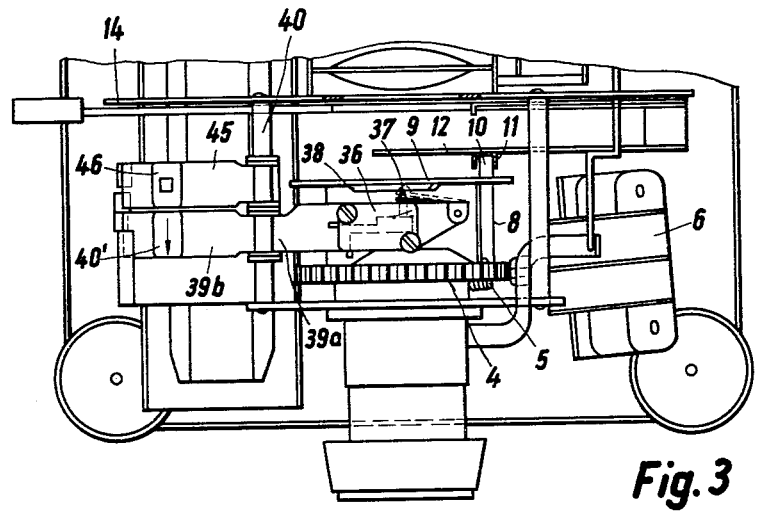
FIGURE 3 shows another plan view of the front portion of the projector.
Figure 4:
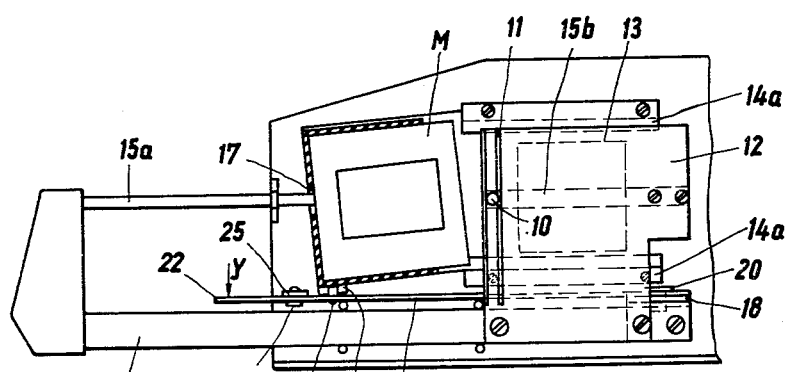
Figure 5:
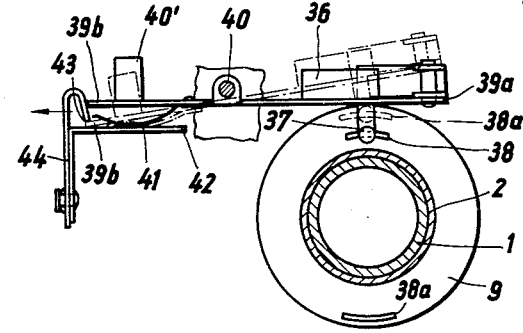
FIGURE 5 shows a partial view of a control disk which is rotatably mounted on the guide tube of the projector lens, and of the control means which are actuated by the control disk.

The slide changing cycle operates as follows:

When the electric motor 6 is switched on in a manner as will be later described, gear 4 which is rotatable on guide tube 2 of projector lens 1 will carry out one complete revolution. This will move slide carrier 15 by means of crank pin 10 on control disk 9 from the position shown in FIGURE 1 to the position shown in FIGURE 4. During this movement, the second arm 15b of slide carrier 15 also returns the projected slide back into the magazine M, while the driving arm 15a is then located outside of the magazine and in a position as shown in FIGURES 2 and 4. During this movement of slide carrier 15 the coupling arm 19 is connected with the coupling member 25 in the manner as described above, and cam 33 on gear 4 is then in a position in which, by means of roller 32 resting against the cam, it begins to pivot the control lever 30a, 30b around pivot pin 30 into the position shown in FIGURE 3, whereby the coupling member 25 by means of its stops 23 and 24 also takes along the coupling lever 19 which then, by means of pin 28 moves the magazine M forwardly by the distance of two slides D in the magazine. This movement is restricted by stop pin 35 on the coupling member 25 which engages with wall 14, as shown in FIGURE 2. Thus, a new slide D has been brought within the range of slide carrier 15. At this point of the cycle, cam 33 has also moved past the roller 32 on control lever 30a, 30b and the slide carrier 15 begins to turn to the right whereby its actuating arm 15a is moved into the magazine to push another slide D in front of the light aperture 13. During this process, tongue 22 of coupling lever 19 has left the stops 23 and 24 of coupling member 25, and pin 28 has also moved out of rack 29 on magazine M. Consequently, coupling member 25 will then return to its starting position under the action of spring 26. This movement is also restricted by stop 24 engaging with wall 14.

As soon as during this feeding step the slide has reached its position for projection in front of light aperture 13, the control disk 9 will switch off the motor so that all of the elements of the mechanism will be at rest for the period during which the slide is projected onto the screen and until the next slide change is started.

Figure 6:
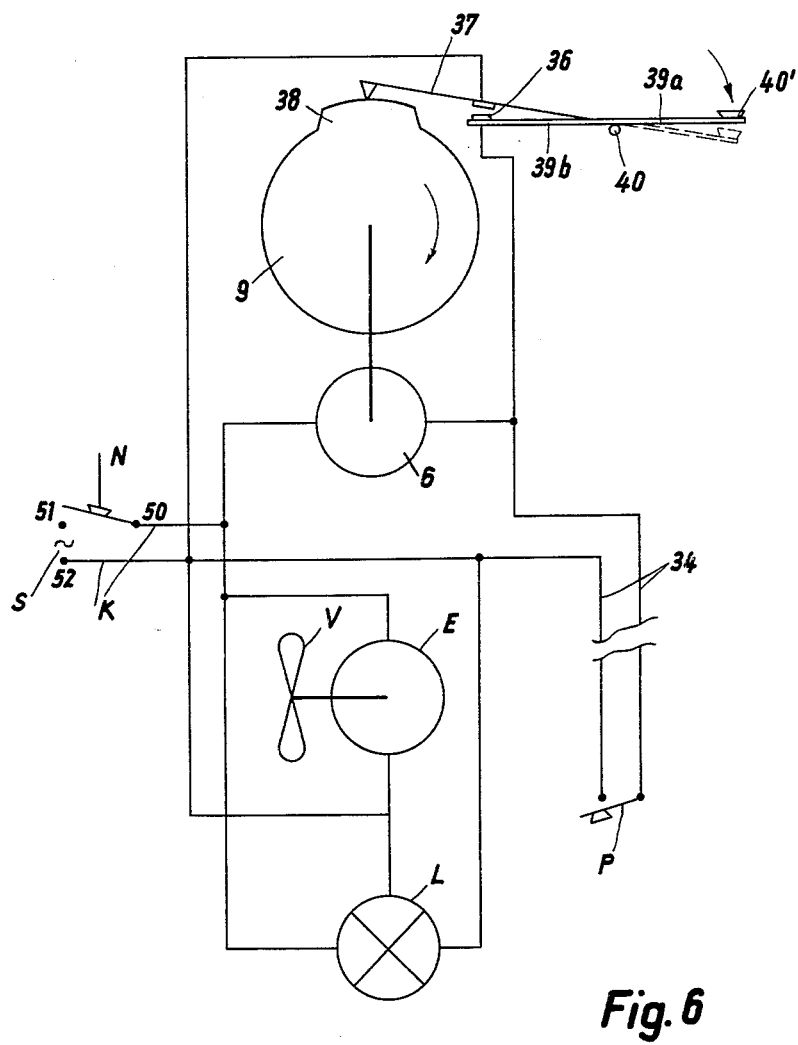
FIGURE 6 is a schematic representation of the circuit diagram employed in the new slide projector of this invention.

The circuit for operating the electric motors and lamp of the projector are shown in FIG. 6. Motor E for operating the fan V, motor 6 for operating the controlling disk 9 and lamp L are shown as being connected in parallel to the terminals of a source S by means of cable K and the manually controlled switch N. In one of the leads to the motor 6 is a switch comprising a pair of contacts, one of which contacts 36 is fixed and the other movable and spring pressed into engagement with the fixed contact by the resilient arm 37. The switch contacts are shown in the open position, that is, in a position into which contact 36 is moved by the control cam 38 at the end of one revolution of the control disc 9. Shunting the above contact is a second pair of contacts closed by pushbutton P at the remote end of a cable 34 for starting the motor even though the first contacts are open.

As stated above, the motor 6 is switched off after one complete revolution of control disk 9. The switch used for this purpose is a so-called microswitch consisting of a contact element 36 which is connected into the circuit of the motor 6 in parallel connection to a pushbutton contact on the end of a cable 34, and provided with a resilient switch arm 37. This arm projects into the path of a control cam 38 which is secured to or integral with control disk 9. After each full revolution of control disk 9, cam 38 will move switch arm 37 in the direction opposite to its spring action which will cause the microswitch 36 to cut off the power to the motor so that all elements of the mechanism will come to a stop.

A new cycle may be started by a quick push on the pushbutton switch at the end of cable 34 which will momentarily bridge the circuit which is otherwise interrupted by the microswitch and thus start motor 6. Control cam 38 will then disengage from switch arm 37 and the spring action of the latter will close the circuit for the duration of one full revolution of control disk 9, whereupon cam 38 will once again engage with switch arm 37 of the microswitch to open the circuit.

In order to close microswitch 36 directly to start a feeding cycle without using the remote control means on cable 34, the microswitch is mounted on the arm 39a of a two-armed lever 39a, 39b which is pivotably mounted on a pivot pin 40. The other arm 39b of this lever carries a key 40' and rests on a spring 41 which tends to maintain the lever in a position in which the switch arm 37 of the microswitch extends into the path of movement of control cam 38. When the operator depresses key 40' until the bent end of spring 41 touches a plate 42 on which the spring is mounted, the switch arm 37 will slide radially off the cam 38 and the microswitch will close the circuit of motor 6 for one complete feed cycle, provided the operator has released key 40' to enable spring 41 to pivot the microswitch back into a position in which switch arm 37 again passes into the path of movement of control cam 38. The next feeding cycle may then be started in the same manner as described or by depressing the pushbutton on the end of cable 34.

To exchange one slides magazine M for another, provision must be made to stop slide carrier 15 also in a position in which its driving arm 15a extends outside of the magazine, as shown in FIGURES 2 and 4. This position is opposite to the one in which slide carrier 15 is normally stopped in the cycle as above described, and it is thus in accordance with one-half revolution of control disk 9.

Disk 9 has a second control cam 38a diametrically opposite to the first-named control cam 38 and disposed on disk 9 at a greater radial distance from its center than cam 38.

If key 40' is depressed beyond the point where the bent end of spring 41 just touches the supporting plate 42 and so as to press this bent end flat upon the plate, the catch 43 of resilient pawl 44 will move over the end of lever arm 39b and hold the lever in its depressed position. During this process, the switch arm 37 of microswitch 36 first moved radially downward by the control cam 38, whereby motor 6 is switched on as described above whereupon switch arm 37 passes into the path of movement of control cam 38a which will disconnect micro-switch 36 after disk 9 has completed one-half revolution and thereby interrupt the circuit of motor 6. Slide carrier 15 will then rest in a position, in which its actuating arm 15a extends outside of the magazine, so that the latter may now be replaced by another magazine.

For this purpose, the tongue end 22 of coupling lever 19 must be depressed in the direction shown by arrow y in FIGURE 4 in order to withdraw pin 28 on coupling lever 19 from its engagement with rack 29 on magazine M.

By depressing a second key 46 which is mounted on an arm 45 which is pivotable about an axis 40, pawl 44 may be moved away from the end of lever 39 against the action of its spring so that catch 43 will release the lever, which will then return by the action of spring 41 into the position in which switch arm 37 of the microswitch is in the path of movement of control cam 38. During this process, switch arm 37 will first slide off control cam 38a, thereby closing the circuit of motor 6 and moving slide member 15 from the position shown in FIGURE 4 toward the right into the position in which a slide is pushed in front of light aperture 13, which is effected by a half turn of control disk 9. This also brings control cam 38 again into contact with switch arm 37 whereby the circuit of motor 6 which is connected to a power line by a cable K, will be interrupted.

A new feed cycle may now be started either by depressing key 40' or the pushbutton which is attached to the end of cable 34.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. In a slide projector having a housing, a guide tube carried by said housing, a projector lens mounted in said guide tube so as to be rotatable and axially slidable therein and to be focused thereby, a lamp housing having a projector lamp and a light aperture being in axial alignment with said guide tube, a slide magazine adapted to hold a plurality of slides and to be moved parallel to the optical axis of the lens, a movable slide carrier for engaging one slide at a time in the magazine, moving the slide out of the magazine and in front of said light aperture of said lamp housing and for returning said slide into said magazine and an actuating mechanism for actuating said slide carrier and moving said magazine in predetermined sequence comprising in combination an electric motor, a driving member rotatable by said motor, a driving wheel rotatably mounted on and carried by said guide tube and driven by said driving member, a control disc mounted on said driving wheel so as to form a rotatable unit therewith, a crank pin on said unit engageable with said slide carrier for reciprocating the latter when said unit is rotated, a cam secured to said unit, a control lever pivoted intermediate its ends and having one end in the path of said cam, an advancing member movable parallel to said magazine and pivotally connected to the other end of the control lever for movement thereby under the control of the cam, and coupling means actuated by said slide carrier to connect the advancing member with said magazine when said slide carrier has moved a slide from said light aperture into said magazine and to disconnect the same when said slide carrier moves from said magazine to said light aperture.

2. In a slide projector as defined in claim 1, in which the driving member comprises a worm driven by said motor, said driving wheel being a gear in engagement with said worm, a vertical guide rail of U-shaped cross section, said crank pin extending into the space between the walls of said guide rail and a plate secured to said guide rail and connected to said slide carrier, said plate being adapted to cover said light aperture when said slide carrier is returning a slide into said magazine.

3. In a slide projector as defined in claim 1, wherein said coupling means comprises an arm pivotably mounted on said slide carrier on a vertical pivot, a spring acting upon said arm to urge the same in the direction towards said slide carrier, said magazine having a rack, said arm being movable by said slide carrier to engage said advancing member, a pin on said arm movable into engagement with said rack and a spring connected to said advancing member to urge the one end of said control lever toward said cam secured to said unit, so that when said cam pivots said control lever, said advancing member will move said arm and thereby move said pin between the teeth of said rack on said magazine so as to move said magazine by a distance equal to that between two adjacent slides within said magazine, and means engageable with stops on the advancing member for limiting the movement of said magazine.

4. In a slide projector as defined in claim 1, wherein said slide carrier comprises an actuating arm adapted to enter into the magazine through a slot in a side wall thereof when said slide carrier moves from the magazine in the direction of said light aperture, and a pushing arm adapted to push a slide from a position in front of said light aperture back into said magazine when said slide carrier moves back from said light aperture to said magazine, said actuating arm of said slide carrier cooperating with the walls of said slot to lock said magazine against further movement when said arm is being moved thereinto.

5. In a slide projector as defined in claim 1, including a switch cam mounted on the control disc, a circuit for energizing the motor comprising a microswitch having a pair of series connected contacts normally spring-pressed to close the circuit to energize the motor, and a switch control member projecting into the path of the switch cam for operation thereby during a part of the rotation of the control disc to open the contacts against their spring pressure after one complete revolution of the control disc, whereby the motor will be deenergized.

6. In a slide projector as defined in claim 5, wherein said microswitch contacts are connected into the circuit of said motor in parallel with a pair of manually operated contacts on the remote end of an electric cable connected to the microswitch contacts, said manually operated contacts when actuated to momentarily close being adapted to close the circuit of said motor for a short time, whereby the motor will be started to rotate said control disk, and said switch cam will be moved away from said switch control member and the circuit of said motor will be closed by said microswitch until said switch cam is moved against said switch control member to open the microswitch contacts against their spring pressure whereby the circuit of said motor is opened after said control disk has completed one revolution.

7. In a slide projector as defined in claim 6, further comprising a pivotable arm carrying said microswitch, said switch control member being mounted on one of the microswitch contacts, and a curved spring for normally maintaining said arm in a position in which said switch control member is disposed within the path of movement of said control cam on said control disk, said arm being adapted to be momentarily pivoted by hand to a first position to move said switch control member off said control cam, whereby the contacts of said microswitch and the circuit of said motor will be closed until said control cam again opens said microswitch after one revolution of said control disk.

8. In a slide projector as defined in claim 7, further comprising a second switch control cam on said control disk diametrically opposite to said first control cam and at a greater radial distance than said first cam from the axis of said control disk, said switch control member being adapted to be moved into the path of movement of said second control cam when said pivotable arm is depressed to a second position to compress the bent end of said spring to a flat position on the supporting plate, a resilient pawl engageable with said pivotable arm to lock it in its second position after closure of the contacts by movement of said switch control member off said first control cam, said second control cam being engageable with said switch control member to open the contacts after said control disk has completed one-half revolution, whereby said motor will be switched off at a time when said slide carrier has returned a slide to said magazine.

References Cited in the file of this patent
UNITED STATES PATENTS

| | | |
|---|---|---|
| 2,579,281 | Tuck | Dec. 18, 1951 |
| 2,594,162 | Hartley | Apr. 22, 1952 |
| 2,632,362 | Smith | Mar. 24, 1953 |
| 2,784,817 | Lessman | Mar. 12, 1957 |